Oct. 22, 1968
C. C. FAY
3,406,522
MASTER PISTON ACTUATOR
Filed Feb. 6, 1967
2 Sheets-Sheet 1
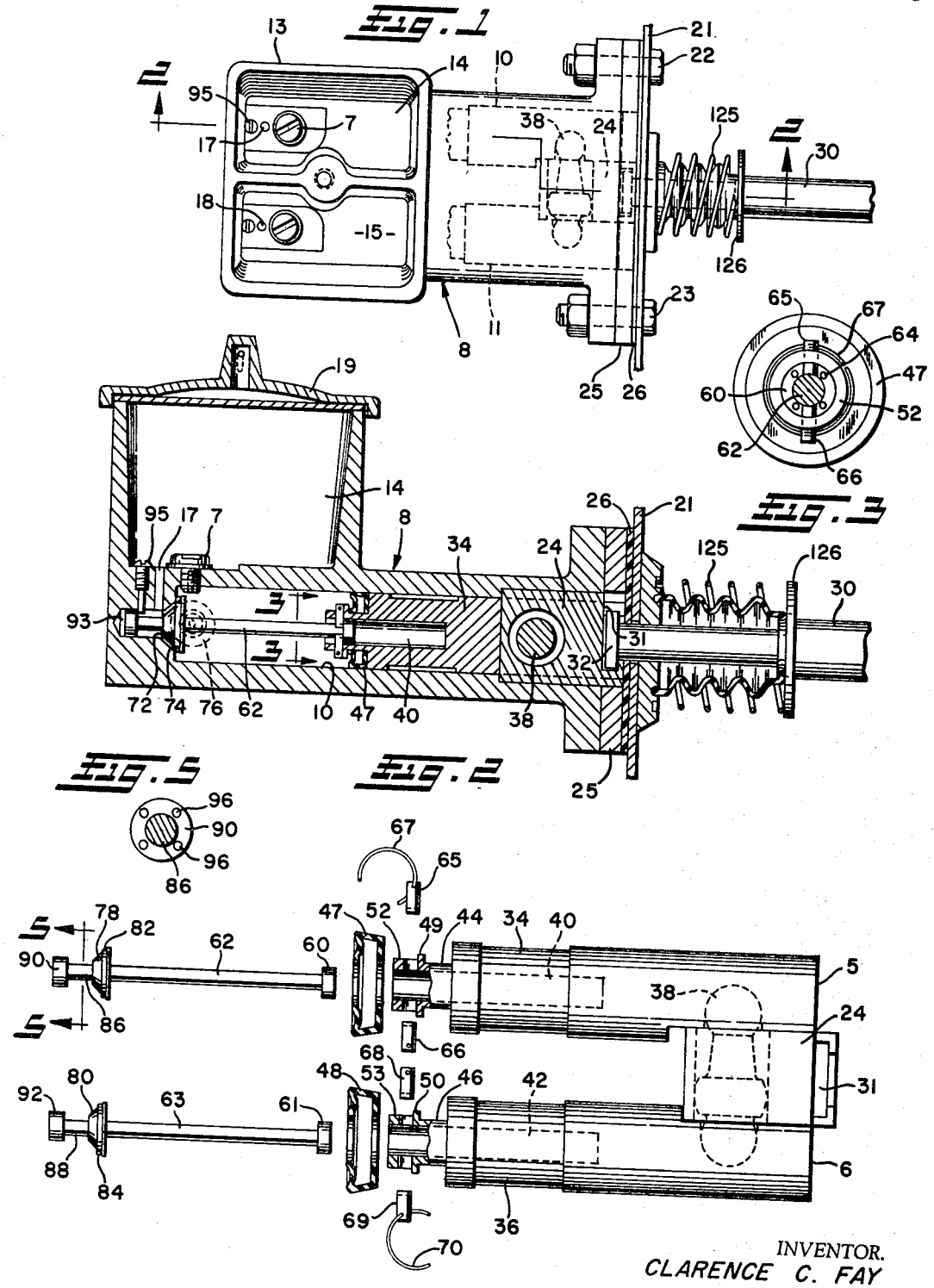
INVENTOR.
CLARENCE C. FAY
BY Kramer & Sturges
ATTORNEYS Oct. 22, 1968
C. C. FAY
3,406,522
MASTER PISTON ACTUATOR
Filed Feb. 6, 1967
2 Sheets-Sheet 2
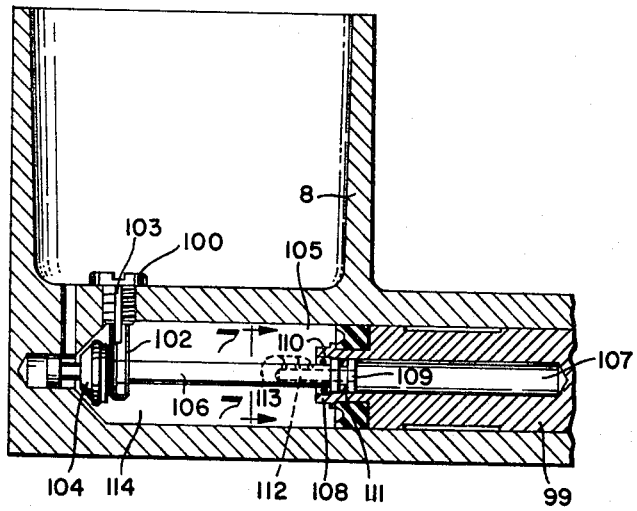
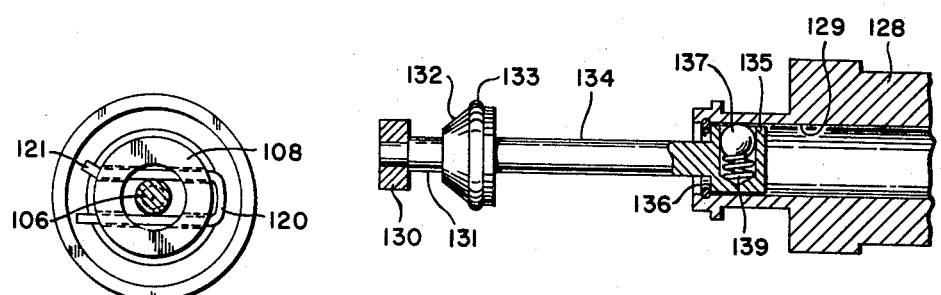
INVENTOR.
CLARENCE C. FAY
BY
Kramer & Sturges
ATTORNEYS United States Patent Office 3,406,522
Patented Oct. 22, 1968

3,406,522
MASTER PISTON ACTUATOR
Clarence C. Fay, 17211 Edgewater Drive,
Lakewood, Ohio 44107
Filed Feb. 6, 1967, Ser. No. 619,497
12 Claims. (Cl. 60—54.6)

ABSTRACT OF THE DISCLOSURE

This invention relates to a master piston actuator for use with a hydraulic subsystem to actuate one or more hydraulic fluid responsive devices, e.g., a master piston for actuating brake cylinders in an automotive vehicle. These actuators are characterized by a fluid pressurizing piston movable in a cylinder communicating with a fluid reservoir and a valve and a valve seat at one end of the cylinder, said valve having a stem extending toward and into the piston for relative movement with respect to the piston. Stop means are provided for limiting the axial travel of the valve-valve stem assembly. The actuator itself is free of internal springs.

---

This invention will be described in relation to a dual hydraulic braking system particularly useful in automotive vehicles, for example, trucks, cars, etc., it being understood, however, that this invention is applicable in any hydraulically operated mechanism which employs plural position hydraulic control system, e.g., hydraulic earth mover controls.

In automotive vehicles, the front and rear brakes are more frequently being controlled by two separate hydraulic subsystems, each subsystem having its own master cylinder, and both being actuated by a single pedal operator. The master cylinders are each in communication with a fluid reservoir which provides fluid to the master cylinders. Pistons within the cylinders are driven by the brake pedal and transmit by a hydraulic means fluid under pressure sufficient to operate auxiliary brake cylinders located at each wheel to force the brake shoes or plates against a rotating drum or disc, as the case may be. It has been customary in the master cylinders to provide spring means for returning the piston or pistons to the normal or at rest position and open the compensating port.

The present invention provides a simplified structure for a master piston actuator which is characterized in that it is free of internal springs, and in which the actuation of the valving mechanism communicating with the hydraulic fluid reservoir is more positively operated than heretofore.

Briefly stated, therefore, the present invention is in a master piston actuator having no internal position return spring and comprising a cylinder, a piston reciprocable in said cylinder, said piston including an axial bore closed at one end, and a fluid compensating port at one end of said cylinder communicating with a fluid reservoir and having a valve seat around the opening in the said cylinder. There is also provided a valve body dimensioned to coact with said valve seat to control fluid flow in either direction through the compensating port. A valve stem is provided which is carried by said valve body and extends toward the piston and has its free end extending into the axial bore in the piston for frictional engagement therewith. Means are provided for relieving fluid pressure change within the axial bore resulting from relative movement between the free end of the valve stem and the bore in the piston. Means are also provided for retaining the free end of said valve stem within the axial bore, and stop means are provided for limiting the axial movement of the valve body away from the valve seat.

The invention will be better understood by having reference to the annexed drawings wherein:

FIG. 1 is a top elevational view of a master piston actuator body, with a cover to the reservoir removed, and showing a housing in which the present invention may be embodied.

FIG. 2 is a cross-sectional view of the master piston actuator shown in FIG. 1 as it appears in the plane indicated by the line 2—2, and showing a cover in place on the reservoir, and also showing an embodiment of the piston and valve assembly of the present invention.

FIG. 3 is a front elevational view of the piston head as it appears in the plane indicated by the line 3—3 in FIG. 2.

FIG. 4 is a partially exploded view of the movable elements contained within the master piston actuator of FIGS. 1 and 2, and showing pressure controlling means for providing differential pressure for the dual pistons, and showing the details of the assembly of the valve body-valve stem retaining means.

FIG. 5 is a cross-sectional view of the forward end of a valve body in accordance with this invention as it appears in the plane indicated by the line 5—5 in FIG. 4.

FIG. 6 is a fragmentary cross-sectional view of another embodiment of the present invention showing different means for limiting the axial travel of the valve body and line bleeder means.

FIG. 7 is an elevational view of the piston head as it appears in the plane indicated by the line 7—7 of FIG. 6.

FIG. 8 is a fragmentary cross-sectional view showing different means for frictionally guiding the distal end of the valve stem.

Referring generally to FIGS. 1 and 2, there is here shown a master piston actuator assembly embodying the principles of the present invention and comprising a pair of adjacently disposed master cylinders 10 and 11 which preferably, although not essentially, lie in the same horizontal plane. The master cylinders may have the same or different diameters. The fluid reservoir assembly 13 is compartmented into isolated sections or reservoirs 14 and 15, each section communicating with its respective master cylinder through a pair of spaced passageways or conduits, 17 and 18.

The master cylinders are confined desirably in a single housing 8 which is conveniently a cast body. The reservoir 14 is provided with a suitable cap 19. The master piston actuator assembly is conveniently secured to the fire wall fragmentarily shown in FIGS. 1 and 2 and indicated by the numeral 21, by any suitable means such as bolts 22 and 23. Due to the extension of the adapter 24 beyond the end of the casting of the housing 8, there is conveniently provided a shim 25 between the body of the casting and the fire wall. A gasket 26 may be provided if desired.

Unless the actuator piston assembly is driven from a single manually operated foot pedal conventionally mounted within the cab of the automotive vehicle, not shown, connected to and driving a pitman bar 30 which is removably connected to the master piston actuator 24 by sliding into a recess 31 and being fitted with an enlarged head 32 for limiting axial movement of the pitman bar relative to the master piston assembly. This assembly makes possible easy removal and replacement of the master pistons 34 and 36 in side-by-side relation with hydraulic lines and removing the bolts securing the housing to the fire wall 21, and slideably disconnecting the coupling or head 32 of the pitman 30 from the actuator assembly.

In the embodiment shown, a dual master piston cylinder is shown, the axis of the two pistons lying in a common plane. Referring to FIG. 2, there is shown the right hand piston in cross-section identified as piston 34. The piston actuator 24 is part of an assembly which is more particularly described and claimed in my copending application, Ser. No. 507,381, filed Nov. 12, 1965, now Patent No. 3,370,426, to which reference may be had for a full explanation of the structure and operation of this part of the assembly. In the present case, the particular equalizing means, or pressure regulating means, employed in the master cylinders of the present invention is of no consequence. This invention is concerned with the structure of the piston itself and its coaction with the valve assembly for developing hydraulic fluid movement and pressure.

Referring now more particularly to FIGS. 2 and 5 inclusive, there is shown in FIG. 4 an exploded view of one embodiment of the present invention and showing the master pistons 34 and 36 in side-by-side relation with the piston actuator 24 disposed therebetween, and the pressure regulating "wobble bar" 38 shown in dotted lines coacting between the two pistons in response to axial pressure applied to the actuator 24 by the pitman 30.

Each of pistons 34 and 36 is provided with an internal bore 40 and 42, respectively, each closed at the inner end.

The head portion of the pistons 34 and 36 is suitably machined to provide a shoulder 44 and 46, respectively, adapted to receive flexible pressure cups 47 and 48, respectively, adapted in combination with the cylinders to provide a fluid tight seal with the inner walls of the respective cylinders 10 and 11.

Flexible cups 47 and 48 are desirably dimensioned to be forced over flanges 49 and 50, respectively, and retained thereby on the head of the pistons 34 and 36, respectively.

Each of the pistons 34 and 36 is provided with a cylindrical portion of smaller diameter protruding beyond the flanges 49 and 50 and identified by the numbers 52 and 53 and serving as a convenient location for retaining means for the distal extremities 60 and 61 of the valve stems 62 and 63. In the embodiment shown, a pair of oppositely disposed radial pins 65 and 66 are provided, the length of which is sufficient to extend into the bore 40 to retain the head 60 and prevent its removal from the bore 40. Pins 65 and 66 are removable, and may be locked into position by means of circumferential locking and tensioning wire 67. In like manner, radial pins 68 and 69 and locking ring 70 are provided for the same purpose with respect to piston 36.

Referring back to FIG. 2, cylinder 10 is provided at its outer end with compensating port 72 surrounded by a valve seat 74, in cylinder 10. A corresponding valve body 80 is provided for seating coaction with the corresponding compensating port valve seat in cylinder 11, not shown. In order to improve the sealing coaction between the valve body 78 and the valve seat 74, there is conveniently provided an annular resilient sealing ring 82 which is a conveniently small elastomeric O-ring. In like manner, such a sealing ring 84 is conveniently provided for valve body 80. The valve bodies 78 and 80 are each provided with an integral rearwardly extending valve stem portion 62 and 63, respectively.

In order to guide the valve bodies 78 and 80, respectively, and prevent their misalignment with respective valve seats, for example, valve seat 74, there are conveniently provided projections 86 and 88, respectively. The free ends of the projections 86 and 88 are conveniently provided with enlarged heads 90 and 92, respectively, adapted to reciprocate in a pilot cylinder bore or recess 93 (FIG. 2). The reciprocation of the enlarged head 90 in pilot cylinder bore 93 serves to maintain the axial alignment of the valve body 78 and the valve stem 62. A corresponding recess is provided for the adjacent cylinder 11 which is not shown in detail.

An additional purpose of the enlarged head 90 is to provide a limiting shoulder against which threaded pin 95 may bear through interference with the path of travel of the enlarged head 90. In order to eliminate hydraulic interference with the travel of the enlarged head 90, relief ports 96 may be provided. The fit between the enlarged head 90 and the cylinder bore 93 is a sliding fit.

Other suitable stop means may be provided, an example of which is shown in FIG. 6. In this case, the bleeder screw 7 shown in FIGS. 1 and 2 is replaced with a bleeder screw 100 having an extension 102 on the lower end thereof, adapted to engage behind the valve body 104, and limit the rearward movement thereof. A keyway 103 provides for relief of air trapped within the cylinder 105 by merely backing off on the screw 100 to break the seal with the housing 8. Obviously, the screw 100 must be offset to one side or the other of the valve stem 106 in order to provide a positive stop and to prevent interference of the pin 102 with the valve stem 106 when the screw 100 is being put into place initially.

FIG. 6 also shows another method of retaining distal extremity of the valve stem 106 in the piston bore 107. Here, then, is shown a snap ring 108 which is put into place after the enlarged head 109 is inserted within the piston bore 107. This ring which coacts with a groove in the projecting portion 110 has a sufficient diameter to interfere with the free travel of the enlarged head 109.

Also, it will be observed that the enlarged head 109 is provided with a circumferential groove containing a small ring 111 of metal or rubber, which improves the frictional coaction between the enlarged head 109 and the piston bore 107. In order to provide for relief of pressure of fluid contained within the bore 107, there may be provided an axial bore 112 communicating with radial ports 113 in the main cylinder chamber 114.

FIG. 7 shows another mode of securing distal extremity 109 within the piston 99, and consisting of a U-shaped pin 120. The U-shaped pin 120 is conveniently retained in position by bending one of the legs 121 at its outer extremity, as shown.

As indicated above, no internal springs are provided for the return of the piston 34 (FIG. 2) or for the return for the piston 99 (FIG. 1) integral with pitman 30. This assembly has been found suitable to effect a return of the pistons in a system such as illustrated in FIGS. 1 and 2 to the normal inoperative position. Assistance is also achieved from the brake shoe springs which are in conventional brake drums which force the brake shoe into a position which is away from the drum. These springs have the effect of acting upon the wheel cylinders in such a way as to force fluid to return through port 76 (FIG. 2) into the cylinder cavity 10. This causes a return of fluid under pressure tending to force the piston 34 in rearward direction in complement to the bias offered by the spring 125 acting between the fire wall 21 and the flange 126 on the pitman 30.

As indicated above, the present invention makes possible the elimination of any internal springs and the force for returning the piston to its relaxed or normal position is exterior to the master cylinder thereby simplifying the construction thereof. The device of the present invention is adaptable for use with a pedal return spring such as spring 125 shown in FIGS. 1 and 2, as well as with a power brake booster. A conventional booster includes a return spring which also has the same effect of returning the pistons to their normal positions. The presence of vacuum normally associated with a vacuum booster has the ability of aiding the return of pistons to their neutral positions.

The neutral position of the pistons is such that the ends of the pistons 5 and 6 (FIG. 4) are adjacent the shim, or stop plate 25 (FIG. 2). At this point, the heads 60 and 61 of the valve stems 62 and 63 are in contact with the retaining means, such as the pins 65 and 66 on piston 34, and the pins 68 and 69 on piston 36. In this position, the retainers pull the valve body 78 off the valve seat 74, allowing free communication between the reservoir 14 through the passageway 17 and the compensating port 72 into the interior of cylinder 10. At this time, the stop pin 95 is engaged with the head 90, or the pin 102 is in contact with the rear face of the valve body 104. The above succession of component contacts insures but limits the opening of the fluid conduit 17 in combination with the compensating port 72.

When the master pistons 34 and 36 start to move forward on their fluid displacing and pressurizing stroke, they carry with them the heads 60 and 61, respectively, through the frictional engagement with the piston bores 40 and 42. This results in the valve body 78 and the valve body 80 each effecting a seating on their respective valve seats, such as valve seat 74. This valve movement is also assisted by the ramming effect of the fluid in the cylinder 10 against the reverse side of the valve body 78. The fluid ramming effect is somewhat ameliorated by the by-pass ports shown in FIG. 3 and identified with numeral 64. The resilient O-ring 82, set in a groove cut in the tapered face of the valve body 78, is the first to make sealing contact with the valve seat 74, and the valve movement is finally limited when the metallic face of the valve body 78 is seated against the valve seat 74. The four by-pass ports 64 in the head 60 also allow the head 60 to move into the piston bore 40 as the piston advances.

By-pass ports 96 are also provided in the head 90 to permit free movement at this point. With the compensating port 72 closed, and the piston with the plunger seal 47 advancing on the forward displacement and pressurizing stroke, the fluid pressure builds up within the cylinder 10 and holds the valve body 78 in sealing relation with the valve seat 74. This will remain closed until the piston returns to its final or at rest position.

FIG. 8 shows, in fragmentary cross-section, another structure for frictionally guiding the distal extremity of the valve stem in the internal bore in the piston. Thus, piston 128 is provided with an axial bore 129 dimensioned to receive distal head 135 on valve stem 134. Valve stem 134 is, as previously indicated, also provided with a valve body 132 having a resilient ring 133, a projection 131, and an enlarged head 130. Snap retaining ring 136 prevents removal of distal head or pilot 135 from piston bore 129 and coacts between the piston 128 and the head 135 to unseat valve body 132 from its valve seat. Distal head 135 is provided with a radial bore, including a ball 137 biased by a spring 139 into contact with the inner wall of bore 129, thereby tending to resist relative movement between the distal head 135 and the piston 128. Thus, on the forward stroke of piston 128, in applying the brakes for example, valve body 132 is positively and quickly seated in its valve seat. On the return stroke, it is quickly unseated to allow pressure equalization between the reservoir and the cylinder.

Thus, there has been provided an improved and simplified master piston actuator structure which is characterized in that internal springs are eliminated and the nature and opposition of the moving parts are such that improved reliability and maintenance are available. The structure proves quite simple and trouble-free in actual use.

What is claimed is:

1. In a master piston actuator having fluid supply means comprising in combination:
    (a) a cylinder, free of internal springs;
    (b) a piston reciprocal in said cylinder;
    (c) said piston including an axially directed bore closed at one end;
    (d) a compensating port in one end of said cylinder communicating with said fluid supply means;
    (e) a valve seat surrounding said compensating port;
    (f) a valve body coacting with said valve seat to control fluid flow in either direction through said compensating port;
    (g) a valve stem carried by said valve body extending toward said piston and having its distal end extending into said axially directed bore;
    (h) means for relieving fluid pressure change within said axially directed bore resulting from relative movement between the distal end of said valve stem and said piston;
    (i) means for retaining said distal end within the axially directed bore, and
    (j) stop means for limiting the movement of the valve body away from the valve seat.

2. An actuator in accordance with claim 1, additionally characterized by:
    (k) means coacting between the cylinder and the valve body for maintaining the valve and valve stem in axial alignment with the axis of the cylinder.

3. An actuator in accordance with claim 2, wherein the alignment means includes a pilot bore in one end of the cylinder and a projection extending from the valve body reciprocal in said pilot bore.

4. An actuator in accordance with claim 3, wherein the projection from the valve body includes an enlarged head dimensioned for sliding coacting in said pilot bore.

5. An actuator in accordance with claim 4, wherein the enlarged head includes fluid pressure relief means.

6. An actuator in accordance with claim 1, wherein the distal end of the valve stem includes an enlarged head dimensioned for sliding relation with the axially directed bore in said piston.

7. An actuator in accordance with claim 6, wherein the enlarged head of the valve stem includes a restraining means slideably coacting between the axially directed bore and the enlarged head.

8. An actuator in accordance with claim 3, including fluid pressure relief means coacting between the interior of the axially directed bore in said piston and the cylinder.

9. An actuator in accordance with claim 4, wherein the stop means includes a pin extending to intercept the enlarged head on the valve body projection after movement of a predetermined distance.

10. An actuator in accordance with claim 1, wherein the stop means includes a removable pin coacting between the cylinder wall and the rearward face of the valve body after movement of the valve body a predetermined distance.

11. An actuator in accordance with claim 6, wherein the retaining means for said enlarged head on said distal end includes radially inwardly directed pins adapted to seat behind said head and prevent its removal from said axially directed bore, and means for retaining said pins in place.

12. An actuator in accordance with claim 6, wherein the retaining means for said enlarged head on said distal end includes a snap ring coacting with the inner surface of said axially directed bore adapted to seat behind said head and restrict the diameter of said bore to prevent removal of the said head from said bore.

References Cited

UNITED STATES PATENTS

| | | | |
|---|---|---|---|
| 2,305,764 | 12/1942 | Farina | 60—54.6 |
| 3,117,421 | 1/1964 | Stelzer | 60—54.6 |
| 3,143,860 | 8/1964 | Stelzer | 60—54.6 |
| 3,181,299 | 5/1965 | Page | 60—54.6 |

MARTIN P. SCHWADRON, *Primary Examiner.*

ROBERT R. BUNEVICH, *Assistant Examiner.*